(12) United States Patent
Marsala et al.

(10) Patent No.: US 10,267,943 B2
(45) Date of Patent: *Apr. 23, 2019

(54) MONITORING HYDROCARBON RESERVOIRS USING INDUCED POLARIZATION EFFECT

(71) Applicant: Saudi Arabian Oil Company, Dhahran (SA)

(72) Inventors: Alberto F. Marsala, Dhahran (SA); Michael S. Zhdanov, Salt Lake City, UT (US); Vladimir Burtman, Salt Lake City, UT (US)

(73) Assignee: Saudi Arabian Oil Company, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 16/130,764

(22) Filed: Sep. 13, 2018

(65) Prior Publication Data

US 2019/0011593 A1    Jan. 10, 2019

Related U.S. Application Data

(63) Continuation of application No. 15/991,826, filed on May 29, 2018, which is a continuation of application
(Continued)

(51) Int. Cl.
*E21B 47/12* (2012.01)
*G01V 3/26* (2006.01)
(Continued)

(52) U.S. Cl.
CPC ............ *G01V 3/26* (2013.01); *E21B 47/12* (2013.01); *G01V 3/06* (2013.01); *G01V 3/24* (2013.01); *G01V 3/34* (2013.01); *G01V 3/38* (2013.01)

(58) Field of Classification Search
CPC ............ G01V 3/26; G01V 3/24; E21B 47/12
(Continued)

(56) References Cited

U.S. PATENT DOCUMENTS 5,151,658 A    9/1992  Muramatsu et al.
5,877,995 A    3/1999  Thompson
(Continued)

FOREIGN PATENT DOCUMENTS

EP    1803001 B1    2/2012
WO    2014058425    4/2014
WO    2015027084    2/2015

OTHER PUBLICATIONS

Al-Shehri et al., "Illuminating the Reservoir: Magnetic NanoMappers", SPE 164461, Society of Petroleum Engineers, presented at the SPE Middle East Oil and Gas Show and Exhibition on Mar. 10-13, 2013, 10 pages.
(Continued)

*Primary Examiner* — Silvana C Runyan
(74) *Attorney, Agent, or Firm* — Fish & Richardson P.C.

(57) ABSTRACT

Some examples of monitoring hydrocarbon reservoirs using induced polarization effect includes inducing polarization in a subterranean zone using an induced polarization fluid. The subterranean zone includes first formations and second formations. A quantity of hydrocarbons in the first formations is greater than quantity of hydrocarbons in the second formations. The induced polarization data is obtained from the subterranean zone. A portion of the induced polarization data from the first formations is different from a portion of the induced polarization data from the second formations. The second formations in the subterranean zone are identified based on the obtained induced polarization data.

9 Claims, 3 Drawing Sheets

Related U.S. Application Data

No. 15/083,756, filed on Mar. 29, 2016, now Pat. No. 9,983,328.

(60) Provisional application No. 62/140,188, filed on Mar. 30, 2015.

(51) Int. Cl.
  *G01V 3/24* (2006.01)
  *G01V 3/06* (2006.01)
  *G01V 3/38* (2006.01)
  *G01V 3/34* (2006.01)

(58) Field of Classification Search
  USPC .................................................. 166/250
  See application file for complete search history.

(56) References Cited

U.S. PATENT DOCUMENTS

| | | |
|---|---|---|
| 6,739,165 B1 | 5/2004 | Strack |
| 6,740,141 B2 | 5/2004 | Espin et al. |
| 7,721,803 B2 | 5/2010 | Huang et al. |
| 8,168,570 B2 | 5/2012 | Barron et al. |
| 8,230,918 B2 | 7/2012 | Ameen |
| 8,253,417 B2 | 8/2012 | Pislak et al. |
| 8,269,501 B2 | 9/2012 | Schmidt et al. |
| 8,347,985 B2 * | 1/2013 | Bittar ................ E21B 47/0905 175/61 |
| 8,664,586 B2 | 3/2014 | Schmidt |
| 8,997,868 B2 | 4/2015 | Nguyen et al. |
| 9,002,649 B2 | 4/2015 | Bittar |
| 9,080,097 B2 | 7/2015 | Gupta et al. |
| 9,689,253 B2 * | 6/2017 | Rivero ................ E21B 47/1015 |
| 9,983,328 B2 * | 5/2018 | Marsala ................ G01V 3/26 |
| 2008/0290874 A1 | 11/2008 | Seleznev et al. |
| 2009/0288820 A1 | 11/2009 | Barron et al. |
| 2011/0309835 A1 | 12/2011 | Barber et al. |
| 2012/0253680 A1 | 10/2012 | Thompson |
| 2013/0091941 A1 | 4/2013 | Huh |
| 2014/0041862 A1 | 2/2014 | Ersoz |
| 2014/0239957 A1 | 8/2014 | Zhang et al. |

OTHER PUBLICATIONS

Bennetzen et al., "Novel Applications of Nanoparticles for Future Enhanced Oil Recovery", IPTC-17857-MS, International Petroleum Technology Conference on Dec. 10-12, 2014, 14 pages.

Burtman et al, "Experimental Study of Induced Polarization Effect in Unconventional Reservoir Rocks," Geomaterials vol. 04, No. 04, Jan. 1, 2014, 13 pages.

Davydycheva et al, "Electrical-Prospecting Method for Hydrocarbon Search Using the Induced-Polarization Effect," Geophysics, Society of Exploration Geophysicists, vol. 71, No. 4, Jul. 1, 2006, 11 pages.

gpxsurveys.com.au' [online], "Ground Geophysics Induced Polarisation", available on or before Mar. 10, 2015, [retrieved Mar. 10, 2015], retrieved from URL: <http://www.gpxsurveys.com.au/Ground-Geophysics/Induced-Polarisation>, 2 pages.

Marsala et al., "Crosswell Electromagnetic Tomography: from Resistivity Mapping to Interwall Fluid Distribution", IPTC 12229-PP, presented at the International Petroleum Technology Conference on Dec. 3-5, 2008, 6 pages.

Marsala et al., "First Borehole to Surface Electromagnetic Survey in KSA: reservoir mapping & monitoring at a new scale", SPE 146348-PP, presented at the SPE Annual Technical Conference and Exhibition, Oct. 30-Nov. 2, 2011, 10 pages.

Rahmani et al., "Characterizing Reservoir Hetrogeneities Using Magnetic Nanoparticles", SPE-173195-MS, presented at the SPE Reservoir Simulation Symposium on Feb. 23-26, 2015, 29 pages.

Zhdanov et al., "Carbonate Reservoir Rocks Show Induced Polarization Effects, Based on Generalized Effective Medium Theory", 75th EAGE Conference & Exhibition , Jun. 2013, 5 pages.

Patent Office of the Cooperation Council for The Arab States of the Gulf, Examination Report, GCC Patent Office, GCC Application No. GC 2016-31084, Jun. 5, 2018, 4 pages.

Chinese Office Action issued in Chinese Application No. 201680031914.1 dated Jan. 28, 2019, 11 pages.

\* cited by examiner

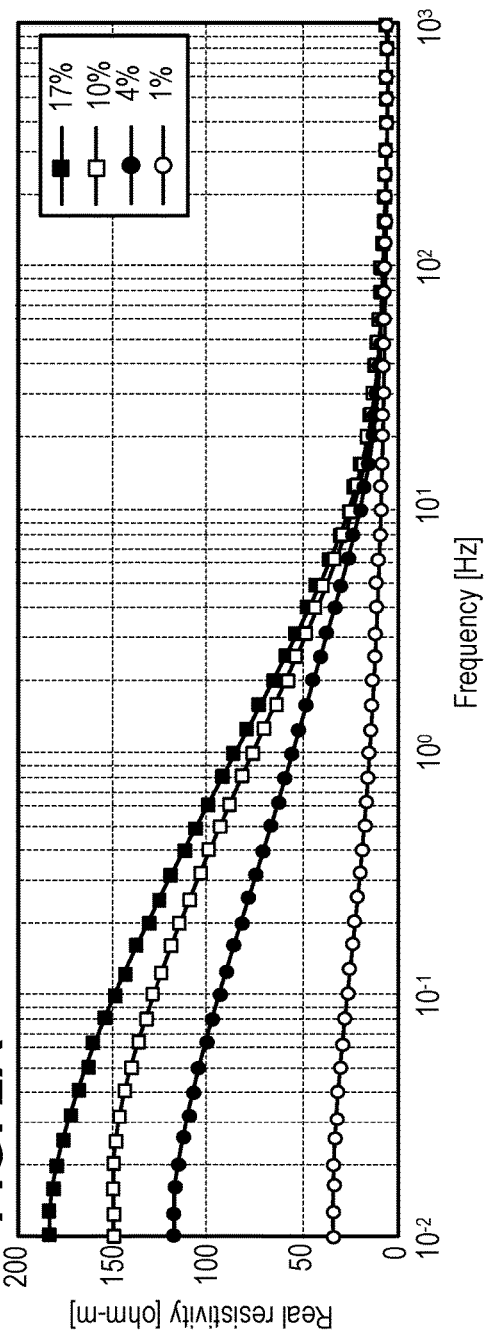
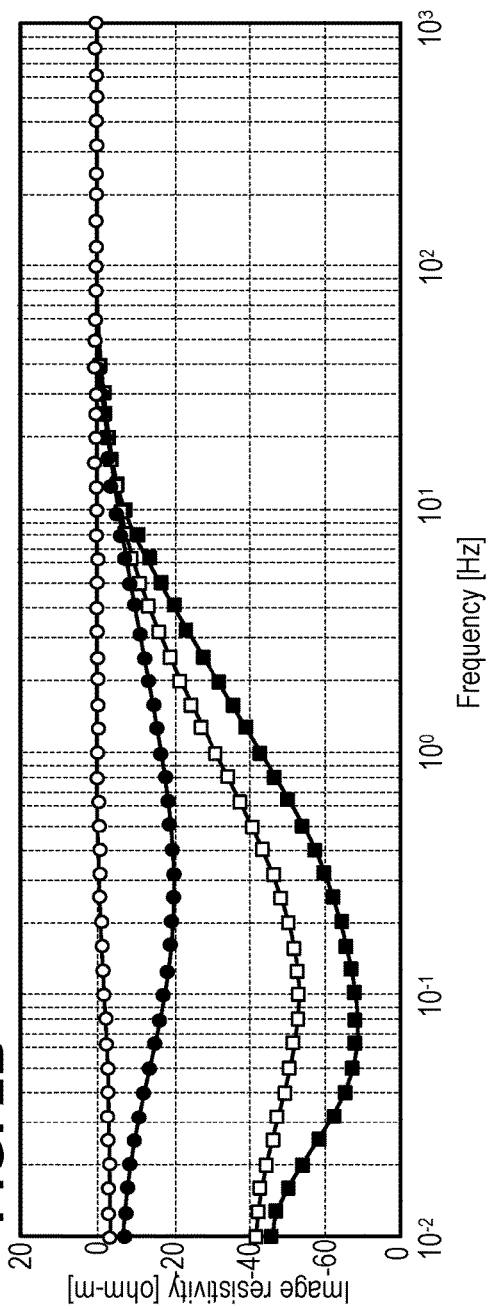

MONITORING HYDROCARBON RESERVOIRS USING INDUCED POLARIZATION EFFECT

CROSS-REFERENCE TO RELATED APPLICATIONS

This application is a continuation application of and claims the benefit of priority to U.S. patent application Ser. No. 15/991,826, filed on May 29, 2018, which is a continuation application of U.S. patent application Ser. No. 15/083,756, filed on Mar. 29, 2016, which claims priority to U.S. Provisional Application Ser. No. 62/140,188, filed on Mar. 30, 2015, the contents of which are hereby incorporated by reference.

TECHNICAL FIELD

This application relates to hydrocarbon reservoir monitoring or hydrocarbon reservoir imaging (or both).

BACKGROUND

Electromagnetic (EM) surveys are widely used in geophysical exploration and other applications. These surveys are based on measurements of the electric or magnetic fields (or both) on the ground, in boreholes, at the sea bottom or from airborne platforms. Compared to traditional seismic technology, EM technology is a more reliable and direct indicator of subsurface hydrocarbons. EM technology can be complementary to traditional seismic technology and can raise exploration success rates. EM methods can be extended to the production phase through the development of integrated four-dimensional EM data acquisition/interpretation method for the monitoring of producing wells in connection with the enhanced recovery of hydrocarbons ("EOR") and environmental monitoring of carbon dioxide deposits in geological formations.

SUMMARY

This application relates to monitoring hydrocarbon reservoirs using induced polarization effect.

In some aspects, a method includes inducing polarization in a subterranean zone using an induced polarization fluid. The subterranean zone includes first formations and second formations. A quantity of hydrocarbons in the first formations is greater than quantity of hydrocarbons in the second formations. The induced polarization data is obtained from the subterranean zone. A portion of the induced polarization data from the first formations is different from a portion of the induced polarization data from the second formations. The second formations in the subterranean zone are identified based on the obtained induced polarization data.

This, and other aspects, can include one or more of the following features. The induced polarization fluid can be flowed into the subterranean zone. The second formations can absorb more induced polarization fluid than the first formations. The induced polarization fluid can include an injection fluid that can include multiple particles configured to induce polarization in an electromagnetic field. The multiple particles can include nanoparticles. The injection fluid can include organic material. The multiple particles can include inorganic material. The injection fluid can include brine. The subterranean zone can include an injection wellbore into which the induced polarization fluid can be flowed. Flow of the induced polarization fluid through the injection wellbore can be traced based, in part, on the obtained induced polarization data. The first formations can include reservoir rock at least partially saturated with hydrocarbons. To induce polarization in the subterranean zone using the induced polarization fluid, an induced polarization system can be positioned in the subterranean zone. The induced polarization system can include a transmitter positioned within the subterranean zone and multiple receivers, each positioned on a surface of the subterranean zone. The transmitter can be configured to transmit an electromagnetic signal through the subterranean zone. The induced polarization data can be generated in the subterranean zone in response to the electromagnetic signal. Each receiver can be configured to measure at least a portion of the induced polarization data generated in the subterranean zone in response to the electromagnetic signal. To identify second formations based on the obtained induced polarization data, volume distribution of electrical resistivity and chargeability in the subterranean zone from the induced polarization data can be determined. To determine the volume distribution of electrical resistivity and chargeability in the subterranean zone, a three-dimensional electromagnetic inversion technique can be applied on the obtained induced polarization data. Changes to the electrical resistivity and chargeability in the subterranean zone can be monitored. The changes to the electrical resistivity and chargeability can be correlated to rock formations in the subterranean zone. Changes to electrical resistivity and chargeability in the first formations can be different from changes to electrical resistivity and chargeability in the second formations that have absorbed the induced polarization fluid. Correlating the changes to the electrical resistivity and chargeability to rock formations in the subterranean zone can include differentiating between first formations and second formations based on differences between the changes to the electrical resistivity and chargeability in the first formations and the changes to the electrical resistivity and chargeability in the second formations that have absorbed the induced polarization fluid.

In some aspects, a system includes processing circuitry configured to perform operations. The operations include obtaining induced polarization data from a subterranean zone. The subterranean zone includes first formations and second formations. A quantity of hydrocarbons in the first formations is greater than quantity of hydrocarbons in the second formations. The induced polarization data is obtained from the subterranean zone. A portion of the induced polarization data from the first formations is different from a portion of the induced polarization data from the second formations. The operations include identifying the second formations in the subterranean zone based on the obtained induced polarization data.

This, and other aspects, can include one or more of the following features. A transmitter can be positioned within the subterranean zone. Multiple receivers can be positioned on a surface of the subterranean zone. The transmitter can be configured to transmit an electromagnetic signal through the subterranean zone. The induced polarization data can be generated in the subterranean zone in response to the electromagnetic signal. Each receiver can be configured to measure at least a portion of the induced polarization data generated in the subterranean zone in response to the electromagnetic signal. The system can include an induced polarization fluid including multiple particles configured to induced polarization in an electromagnetic field. The multiple particles can include nanoparticles. The injection fluid can include organic material. The multiple particles can include inorganic material. The injection fluid can include brine. The subterranean zone can include an injection wellbore into which the induced polarization fluid can be flowed. The processing circuitry can further be configured to trace flow of the induced polarization fluid through the injection wellbore based, in part, on the obtained induced polarization data. The system can include a pumping system configured to flow the induced polarization fluid into the subterranean zone. To identify the second formations based on the obtained induced polarization data, the processing circuitry can be configured to determine volume distribution of electrical resistivity and chargeability in the subterranean zone from the induced polarization data. To determine volume distribution of electrical resistivity and chargeability in the subterranean zone from the induced polarization data, the processing circuitry can be configured to apply a three-dimensional electromagnetic inversion technique on the obtained induced polarization data. The processing circuitry can be configured to monitor changes to the electrical resistivity and chargeability in the subterranean zone and correlate the changes to the electrical resistivity and chargeability to rock formations in the subterranean zone. The changes to the electrical resistivity and chargeability can be correlated to rock formations in the subterranean zone. Changes to electrical resistivity and chargeability in the first formations can be different from changes to electrical resistivity and chargeability in the second formations that have absorbed the induced polarization fluid. To correlate the changes to the electrical resistivity and chargeability to rock formations in the subterranean zone, the processing circuitry can be configured to differentiate between first formations and second formations based on differences between the changes to the electrical resistivity and chargeability in the first formations and the changes to the electrical resistivity and chargeability in the second formations that have absorbed the induced polarization fluid.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2A and 2B show example of complex resistivity spectra of an example rock that has absorbed induced polarization fluid.

DETAILED DESCRIPTION

EM technology can be used to monitor hydrocarbon reservoirs by combined surface and wellbore resistivity mapping. One technique to monitor hydrocarbon reservoirs based on resistivity is to inject tracer fluid into the reservoir. The tracer fluid has a resistivity that is different from a resistivity of the reservoir into which the fluid is injected. Such monitoring techniques are limited because fluids injected during a drilling process can have high conductivity and adding conductive particles may provide insignificant effect on the observed EM data.

This application describes monitoring hydrocarbon reservoirs using induced polarization effect. In some implementations, a reservoir tracer fluid (or fluids) (referred to as an induced polarization fluid in this application) filled with nanoparticles is injected into a subterranean zone. The subterranean zone can include a formation, a portion of a formation or multiple formations. As described below, the tracer fluid filled with nanoparticles can generate induced polarization (IP) effects in reservoir rocks in the subterranean zone. The IP effects in reservoir rocks containing hydrocarbons (for example, oil, gas, other hydrocarbons or combinations of them) can be different from the IP effects in reservoir rocks containing comparatively lesser hydrocarbons. Using electromagnetic methods described here, the IP response from the subterranean zone can be measured and used to map the subterranean zone or monitor the movement of the injected fluids in the subterranean zone (or both). In particular, flowing nanoparticles in a carrier fluid through the reservoir can increase the contrast in IP response between hydrocarbon-rich portions and comparatively hydrocarbon-poor portions of the formation. In addition, including the nanoparticles in the carrier fluid can increase the contrast in IP response that is obtained using the carrier fluid alone.

Mapping the subterranean zone or monitoring the movement of injected fluids in the subterranean zone (or both) can increase hydrocarbon recovery from the subterranean zone. The techniques described here can also be implemented to optimize the placement of wellbores in the subterranean zone. Ultimately mapping hydrocarbons accumulations in the inter-well volumes allow to identify bypassed reserves and maximize the hydrocarbon recovery.

Figure 1:
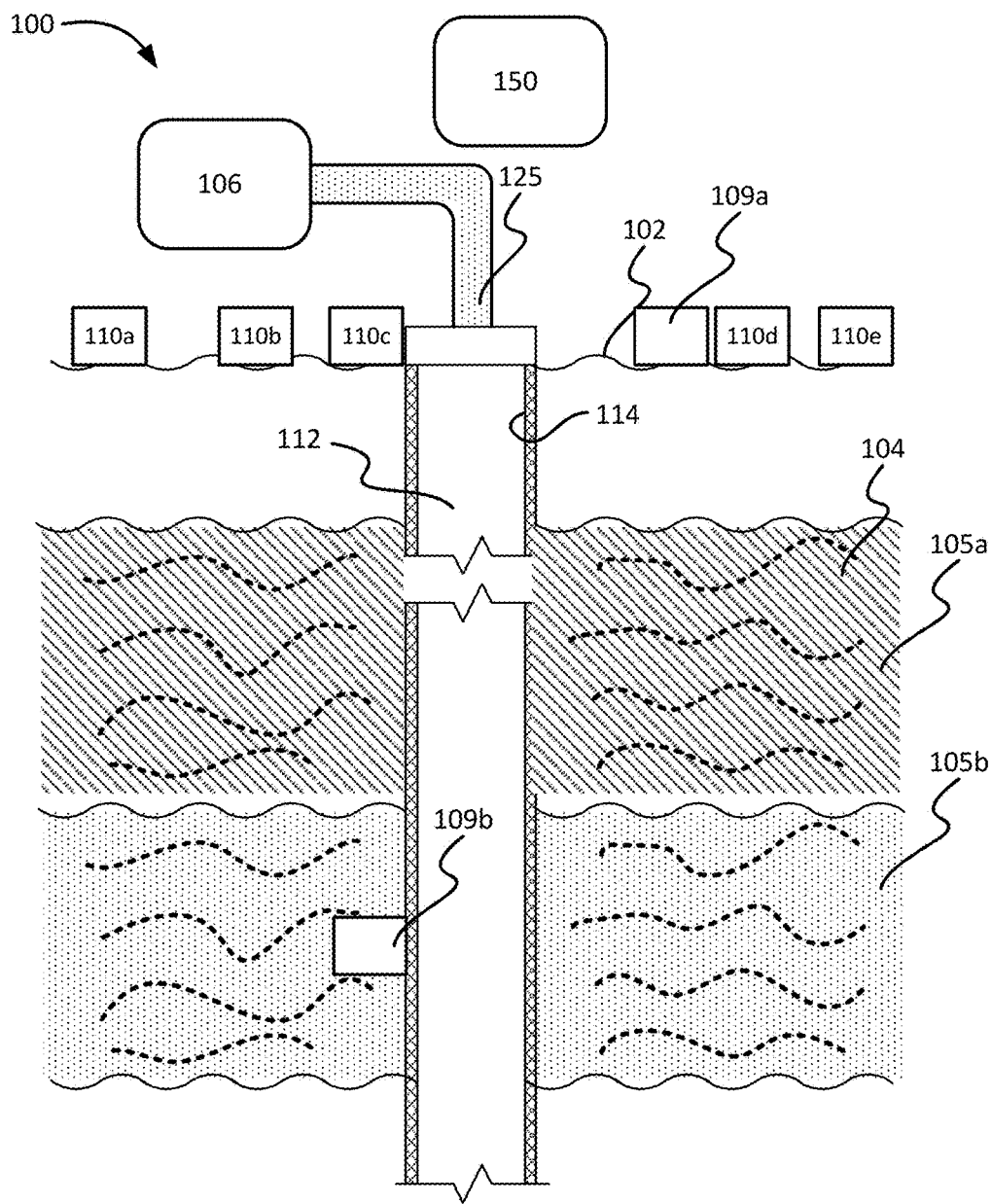
FIG. 1 is a schematic diagram of an example of a subterranean zone including an induced polarization system.

FIG. 1 is a schematic diagram of an example of a subterranean zone 104 including an IP system 150. The subterranean zone 104 can include a formation 105a, multiple formations (for example, a first formation 105a, a second formation 105b, or other formations), or a portion of a formation. The subterranean zone 104 can include a geographical area to be drilled or being drilled for hydrocarbons or that has been drilled and from which hydrocarbons are to be produced or are being produced. In some implementations, a wellbore 112 can have been drilled in the subterranean zone 104. All or portions of the wellbore 112 can have been cased with a casing 114. For example, the wellb ore 112 can be a production wellbore or an injection wellbore into which injection fluid is to be injected for secondary or tertiary production in an adjacent production wellbore (not shown). In some implementations, the techniques described here can be implemented without a wellbore.

In some implementations, the IP system 150 can be a sub-surface to surface system configured to measure spectral IP effects in the reservoir rocks. The IP system 150 can include a transmitter system positioned sub-surface, i.e., below a surface 102 and within the subterranean zone 104. In some implementations, the transmitter system can include a transmitting bipole that includes two electrode points—a first electrode 109a serving as a surface grounding point and a second electrode 109b grounded inside the casing 114 (or grounded at some depth inside the subterranean zone 104). The IP system 150 can also include multiple receivers (for example, a first receiver 110a, a second receiver 110b, a third receiver 110c, a fourth receiver 110d, a fifth receiver 110e, and more or fewer receivers) positioned on the surface 102. In some implementations, the multiple receivers can be distributed at different locations on the surface 102 to form a two-dimensional array. For example, the multiple receivers can be distributed on the surface 102 such that the entrance to the wellbore 112 is at a center of the array. In some implementations, the transmitters 109a and 109b can be positioned inside multiple wellbores. In some implementations, the array of receivers can be positioned in the subterranean zone 104 (i.e., below the surface 102).

In some implementations, a pumping system 106 can pump an IP fluid 125 into the subterranean zone 104. The IP fluid 125 can include any fluid that includes organic material. The IP fluid 125 can be aqueous fluid (such as water) with variable salts. For example, the fluid can include brine. In some implementations, the fluid can be injection fluid to be flowed into an injection wellbore. The fluid can be doped with multiple particles, for example, nanoparticles or particles having a range of sizes (such as a mixture of nanometer and micrometer-sized particles). The particles can include inorganic materials. For example, the particles can include ferrous material or other material in which polarization can exhibit polarization in an electromagnetic field. Doping the fluid with the multiple particles can result in an IP fluid in which polarization can be induced in an electromagnetic field. Examples of particles that can be used include $Fe_3O_4$, $Fe_2O_3$, $NiO$, $Al_2O_3$ in nanoparticle form or any other nanoparticle capable of an induced polarization effect (that is, chargeability) under a frequency variable electromagnetic field.

The subterranean zone 104 can include some portions that carry higher quantities of hydrocarbons (for example, oil, gas or other hydrocarbons) compared to other portions. For example, some portions can be substantially saturated with hydrocarbons while others can be substantially free of hydrocarbons. The quantity of the IP fluid 125 that is absorbed by the portions that carry higher quantities of hydrocarbons can be less than the quantity of the IP fluid 125 that is absorbed by the portions that carry lower quantities of hydrocarbons. The IP system 150 can include processing circuitry 152 configured to image the subterranean zone 104 based on the IP data output by the IP fluid 125, as described below. Such imaging can distinguish portions of the subterranean zone that carry more hydrocarbons from portions that carry comparatively fewer hydrocarbons.

In operation, the pumping system 106 can be operated to flow the IP fluid 125 into the subterranean zone 104. In some implementations, the IP fluid 125 can be injected in the subterranean zone 104 through injector wellbores. A quantity of the IP fluid 125 flowed into the subterranean zone 125 can be sufficient to occupy a significant fraction of the porous space in the reservoir so that an induced polarization variation can be measured in the area of interest. A significant fraction of the porous space in the reservoir can include, for example, greater than 30% of the porous space, between 40% and 90% of the porous space, between 50% and 80% of the porous space, between 60% and 70% of the porous space, to name a few ranges. The processing circuitry 152 in the IP system 150 can be connected to the transmitter system and the multiple receivers. The processing circuitry 152 can cause the transmitter system to transmit an electromagnetic signal through the subterranean zone 104. The electromagnetic signal can be sinusoidal and have a frequency range selected from 0.01 Hz (Hertz) to 1 kHz (kilo Hertz). The amplitude of the sinusoidal waveform can be chosen to provide a high signal-to-noise ratio from 200 mV (milli volt) to 10 volts. The responses from portions of the subterranean zone 104 can be compared with corresponding responses from a reference, for example, reference resistors. For each pair of responses, the difference in phase and amplitude between the two sinusoidal waveforms can be recorded and stored for each current frequency. The differences can be converted into the pairs of real and imaginary parts of complex resistivity for each frequency. When collated, these individual complex resistivity measurements form the complex resistivity spectra. In response, the IP fluid 125 flowed through the subterranean zone 104 can output IP data.

The multiple receivers can record either the frequency domain or time domain EM field and the corresponding spectral IP effect associated with the IP fluid 125 penetrating the different portions of the subterranean zone 104. The multiple receivers can transmit the recorded EM field to the processing circuitry 152. FIGS. 2A and 2B show example of complex resistivity spectra of an example rock that has absorbed IP fluid 125. The spectra show a dependence of the complex resistivity of amount (volume percent) of ferrous nanoparticles doped in partly saturated (10% v/v) by saltwater sand cartridges. FIG. 2A shows the plots of the real part of the complex resistivity spectrum for different volume percentages of inorganic ferrous nanoparticles doped in the salt water. FIG. 2B shows the imaginary part of the same complex resistivity spectrum of ferrous nanoparticles doped in partly (10% v/v) saturated by saltwater sand cartridges.

Using the obtained spectral induced potential data received from the multiple receivers, the processing circuitry 152 can determine volume images of the electrical resistivity and chargeability of the subterranean zone 104. To do so, in some implementations, the processing circuitry 152 can implement a three-dimensional electromagnetic inversion technique to the obtained induced potential data.

The induced potential phenomenon can be mathematically explained by a composite geoelectrical model of the subterranean zone 104. The model is based on the effective-medium approach, which takes into account both the volume polarization and the surface polarization of the porous space. The composite geoelectrical model can allow modeling the relationships between the physical characteristics of different types of rocks and minerals (for example, conductivities, porosity, polarizability) and the parameters of the relaxation model. A generalized effective-medium theory of the induced polarization (GEMTIP) treats in a unified way different complex multiphase composite models of the rocks. In some implementations, the processing circuitry 152 can implement the GEMTIP model consisting of a medium filled with randomly oriented ellipsoidal inclusions. The ellipsoidal inclusions can be used to describe a variety of different shapes ranging from prolate ellipsoids, approximating thin laminating layers, to the oblate relatively thin ellipsoids approximating thin capillaries in the porous space. The GEMTIP model parameters can include the DC resistivity, $\rho_0$, the chargeability parameter, the time constant, and the decay constant of the complex resistivity curves. The chargeability term is a linear function of the fraction volume of the inclusions, and therefore can be expressed as a linear function of the porosity.

Using the three-dimensional electromagnetic inversion technique of the induced potential data acquired over the subterranean zone 104, the processing circuitry 152 can recover a three-dimensional porosity model from a transform of the three-dimensional chargeability model. The processing circuitry 152 can determine three-dimensional fluid saturation models by interpreting the transformation of the three-dimensional chargeability model simultaneously with the three-dimensional resistivity model.

According to the GEMTIP approach, the effective resistivity model for a medium with randomly oriented ellipsoidal inclusions is given by the following equation.

$$\rho_e = \rho_0 \left\{ 1 + \frac{p}{9} \sum_{\alpha=x,y,z} \frac{1}{\gamma_\alpha} \left[ 1 - \frac{1}{1 + s_\alpha (i\omega\tau)^c} \right] \right\}$$

In the above equation, $\rho_0$ is DC resistivity, $\omega$ is frequency, p is chargeability parameter, $\tau$ is time constant, and C is relaxation parameter. The coefficients $\gamma_\alpha$ and $s_\alpha$ ($\alpha$=x,y,z) are the structural parameters defined by geometrical characteristics of the ellipsoidal inclusions used to approximate the porous space. A vector of the unknown model parameters is introduced.

$$m=[p,\tau,C,\gamma,s]$$

A vector, d, of the observed data (i.e., the values of complex resistivity as function of frequency):

$$d=[\rho_e(\omega_1),\rho_e(\omega_2),\ldots \rho_e(\omega_n)].$$

Using these notations, the equation above can be written in the following form:

$$d=A(m).$$

To find the parameters of the GEMTIP model, the equation above can be solved with respect to m. To do so, the processing circuitry 152 can implement an inversion algorithm based on the regularized conjugate gradient (RCG) method, which is an iterative solver that updates the model parameters on each iteration using conjugate gradient directions ($\tilde{l}^\alpha$) according to the following formula:

$$m_{n+1}=m_n+\delta m_n=m_n-k_n \tilde{l}^\alpha(m_n)$$

In the equation above, $k_n$ denotes the iteration steps. Experimental results comparing the observed and GEMTIP predicted data for a rock sample saturated in crude oil from a carbonate reservoir have shown a very good fit of the observed complex resistivity data by the GEMTIP model. Similar good fit was also observed upon comparing the observed and GEMTIP predicted data for other rock samples obtained from carbonate reservoirs.

In some implementations, the processing circuitry 152 can monitor changes to the electrical resistivity and chargeability in the subterranean zone 104, and correlate the changes to the electrical resistivity and chargeability to rock formations in the subterranean zone. For example, the processing circuitry 152 can determine that changes to electrical resistivity and chargeability in portions of the subterranean zone that carry higher quantities of hydrocarbons is different from changes to electrical resistivity and chargeability in portions of the subterranean zone that have absorbed the IP fluid 125. To correlate the changes to the electrical resistivity and chargeability to rock formations in the subterranean zone, the processing circuitry 152 can differentiate between the portions with different quantities of hydrocarbons based on the differences between the changes to the respective electrical resistivities and chargeabilities. In this manner, the processing circuitry 152 can generate a volume image of electric resistivity and chargeability of the rock formations. Using the three-dimensional inversion technique described, the processing circuitry 152 can produce images with sharp contrast between portions of the subterranean zone 104 into which the IP fluid 125 has been absorbed and portions that carry more hydrocarbons into which lesser or no quantities of IP fluid 125 have been absorbed.

In an example of complex resistivity spectra determined for a portion of a subterranean zone that spans about 2.3 kilometers (km) by about 4.6 km, some regions of the spectra are regions of low induced polarization while other regions of the spectra are regions of comparatively high induced polarization. Other regions in the spectra represent regions of intermediate induced polarization between the low induced polarization and the high induced polarization.

Figure 3:
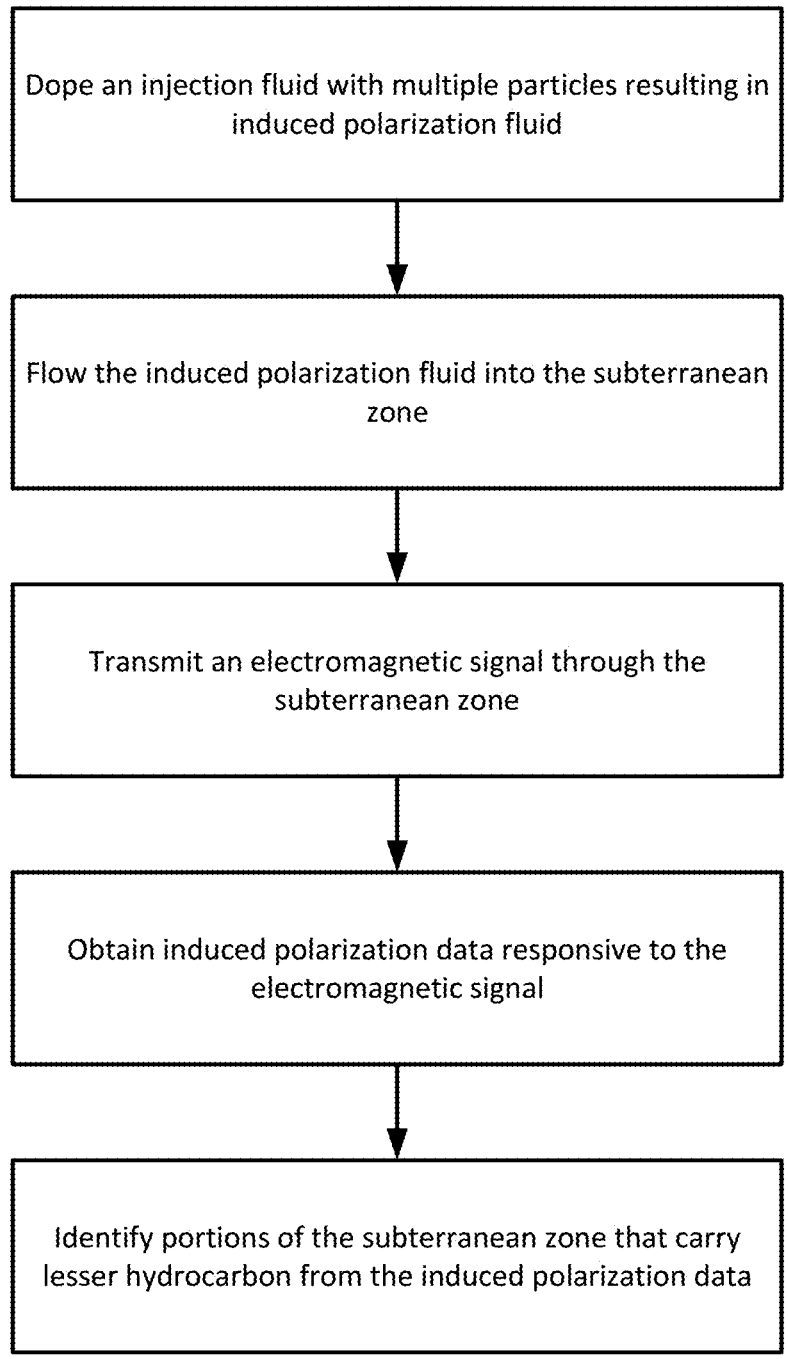
FIG. 3 is a flowchart of an example of a process for monitoring a subterranean zone using induced polarization.

FIG. 3 is a flowchart of an example of a process 300 for monitoring a subterranean zone using IP. In some implementations, the process 300 can be implemented by the IP system 100. At 302, an injection fluid is doped with multiple particles resulting in IP fluid 125. For example, the injection fluid can include brine. The particles can include inorganic nanoparticles, for example, ferrous nanoparticles.

At 304, the IP fluid is flowed into the subterranean zone. For example, the IP fluid 125 can be flowed into the subterranean zone 104 using the pumping system 106. As described above, some portions of the subterranean zone (for example, portions in the same formation or portions in different formations) can carry more hydrocarbons than other portions of the subterranean zone. The portions of the subterranean zone that carry less hydrocarbons can absorb more quantities of the IP fluid 125 than the portions that carry comparatively more hydrocarbons.

At 306, an electromagnetic signal is transmitted through the subterranean zone. For example, the transmitter system is positioned in the subterranean zone 104. The transmitter system transmits the electromagnetic signal through the subterranean zone. The electromagnetic signal induces polarization in the IP fluid 125.

At 308, IP data is obtained. For example, the multiple receivers (for example, receiver 110a, 110b, 110c, 110d, 110e, or more or fewer receivers), each of which is positioned on the surface 102, measure the IP data that is obtained responsive to the electromagnetic signal.

At 310, portions of the subterranean zone that carry lesser hydrocarbons than other portions are identified. For example, as described above, a volume distribution of electrical resistivity and chargeability in the subterranean zone 104 is determined from the IP data. The volume distribution of electrical resistivity and chargeability in the subterranean zone 104 is determined by applying a 3D electromagnetic inversion technique on the obtained IP data. The volume distribution for portions of the subterranean zone 104 that carry more hydrocarbons will be different from the volume distribution for portions of the subterranean zone 104 that carry correspondingly less hydrocarbons. The different in volume distribution of electrical resistivity and chargeability can be correlated to portions of the subterranean zone 104. In this manner, portions of the subterranean zone 104 that carry more hydrocarbons can be differentiated from portions that carry comparatively lesser hydrocarbons.

Thus, particular implementations of the subject matter have been described. Other implementations are within the scope of the following claims.

The invention claimed is:
1. A system comprising:
processing circuitry configured to perform operations comprising:
obtaining induced polarization data from a subterranean zone, the subterranean zone comprising first formations and second formations, a quantity of hydrocarbons in the first formations greater than a quantity of hydrocarbons in the second formations, the induced polarization data induced in the subterranean zone using an induced polarization fluid, a portion of the induced polarization data from the first formations being different from a portion of the induced polarization data from the second formations;
identifying the second formations in the subterranean zone based on the obtained induced polarization data by determining volume distribution of electrical resistivity and chargeability in the subterranean zone from the induced polarization data;

monitoring changes to the electrical resistivity and chargeability in the subterranean zone, wherein changes to electrical resistivity and chargeability in the first formations are different from changes to electrical resistivity and chargeability in the second formations that have absorbed the induced polarization; and correlating the changes to the electrical resistivity and chargeability to rock formations in the subterranean zone, wherein correlating comprises differentiating between first formations and second formations based on differences between the changes to the electrical resistivity and chargeability in the first formations and the changes to the electrical resistivity and chargeability in the second formations that have absorbed the induced polarization fluid.

2. The system of claim 1, further comprising:

a transmitter positioned within the subterranean zone, the transmitter configured to transmit a plurality of alternating currents at a plurality of different frequencies through the subterranean zone, wherein the induced polarization data is generated in the subterranean zone in response to the plurality of alternating currents at the plurality of different frequencies; and a plurality of receivers, each receiver positioned on a surface of the subterranean zone, each receiver configured to measure at least a portion of the induced polarization data generated in the subterranean zone in response to the plurality of alternating currents at a plurality of different frequencies, wherein the portion of the induced polarization data comprises, for each alternating current at a respective frequency, a respective complex resistivity spectrum of the subterranean zone.

3. The system of claim 1, further comprising the induced polarization fluid, the induced polarization fluid comprising an injection fluid comprising a plurality of particles configured to induce polarization in an electromagnetic field.

4. The system of claim 1, wherein the plurality of particles comprises nanoparticles.

5. The system of claim 1, wherein the injection fluid comprises organic material and the plurality of particles comprise inorganic material.

6. The system of claim 1, wherein the injection fluid comprises brine.

7. The system of claim 1, wherein the subterranean zone comprises an injection wellbore into which the induced polarization fluid is flowed, and wherein the processing circuitry is further configured to trace flow of the induced polarization fluid through the injection wellbore based, in part, on the obtained induced polarization data.

8. The system of claim 1, further comprising a pumping system configured to flow the induced polarization fluid into the subterranean zone.

9. The system of claim 1, wherein to determine volume distribution of electrical resistivity and chargeability in the subterranean zone from the induced polarization data, the processing circuitry is configured to apply a three-dimensional electromagnetic inversion technique on the obtained induced polarization data.

* * * * *